(12) United States Patent
Ge et al.

(10) Patent No.: US 11,292,061 B2
(45) Date of Patent: Apr. 5, 2022

(54) THREE-DIMENSIONAL (3D) PRINTING

(71) Applicant: HEWLETT-PACKARD DEVELOPMENT COMPANY, L.P., Houston, TX (US)

(72) Inventors: Ning Ge, Palo Alto, CA (US); Steven J. Simske, Ft. Collins, CO (US); Chandrakant Patel, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 798 days.

(21) Appl. No.: 16/074,274

(22) PCT Filed: Oct. 19, 2016

(86) PCT No.: PCT/US2016/057728
§ 371 (c)(1),
(2) Date: Jul. 31, 2018

(87) PCT Pub. No.: WO2018/075032
PCT Pub. Date: Apr. 26, 2018

(65) Prior Publication Data
US 2021/0178483 A1    Jun. 17, 2021

(51) Int. Cl.
*B22F 10/50* (2021.01)
*B33Y 10/00* (2015.01)
(Continued)

(52) U.S. Cl.
CPC ............ *B22F 10/50* (2021.01); *B22F 1/0018* (2013.01); *B22F 1/0088* (2013.01); *B22F 10/28* (2021.01);
(Continued)

(58) Field of Classification Search
CPC ......... B33Y 10/00; B33Y 40/00; B33Y 40/10; B33Y 40/20; B33Y 70/00; B22F 1/00;
(Continued)

(56) References Cited

U.S. PATENT DOCUMENTS 9,039,916 B1 *  5/2015  Lehman, Jr. .............. F41H 1/02
                                                     216/100
9,381,564 B2    7/2016  Mcguire et al.
(Continued)

FOREIGN PATENT DOCUMENTS

CN          105935772 A    9/2016
RU          2564604 C1    10/2015
(Continued)

*Primary Examiner* — Vanessa T. Luk
(74) *Attorney, Agent, or Firm* — Dierker & Kavanuagh PC

(57) ABSTRACT

In an example of a 3D printing method, build material particles are applied to form a layer. Each build material particle includes a metal core and a metal oxide outer shell. The layer is patterned by selectively applying a reactive chemical on at least a portion of the layer to initiate a redox reaction with the metal oxide outer shells of the build material particles in contact with the reactive chemical, which reduces the metal oxide outer shells of the build material particles in contact with the reactive chemical and exposes the metal cores of the build material particles in contact with the reactive chemical. The patterned layer is exposed to rapid thermal processing to sinter the exposed metal cores to form a part layer. Any intact build material particles remain unsintered.

13 Claims, 4 Drawing Sheets

(51) Int. Cl.
*B33Y 30/00* (2015.01)
*B33Y 70/00* (2020.01)
*B33Y 40/20* (2020.01)
*B33Y 40/10* (2020.01)
*B22F 10/64* (2021.01)
*B22F 12/41* (2021.01)
*B22F 10/28* (2021.01)
*B22F 1/00* (2022.01)

(52) U.S. Cl.
CPC .............. *B22F 10/64* (2021.01); *B22F 12/41* (2021.01); *B33Y 10/00* (2014.12); *B33Y 30/00* (2014.12); *B33Y 40/10* (2020.01); *B33Y 40/20* (2020.01); *B33Y 70/00* (2014.12); *B22F 2301/052* (2013.01); *B22F 2301/10* (2013.01); *B22F 2301/205* (2013.01); *B22F 2301/35* (2013.01); *B22F 2302/253* (2013.01); *B22F 2304/10* (2013.01)

(58) Field of Classification Search
CPC .... B22F 1/0003; B22F 1/0007; B22F 1/0011; B22F 1/0014; B22F 1/0059; B22F 1/0062; B22F 1/007; B22F 1/0081; B22F 1/0085; B22F 1/0088; B22F 1/02; B22F 2001/0066; B22F 2001/0092; B22F 3/001; B22F 3/10; B22F 3/1003; B22F 3/1007; B22F 3/101; B22F 3/1017; B22F 3/1021; B22F 3/1025; B22F 3/1039; B22F 3/105; B22F 2003/1014; B22F 2003/1051; B22F 2003/1052; B22F 2003/1053; B22F 2003/1054; B22F 2301/052; B22F 2301/10; B22F 2301/205; B22F 2301/35; B22F 2302/25; B22F 2302/253; B22F 2302/256; B22F 2302/35; B22F 2304/10
See application file for complete search history.

(56) References Cited

U.S. PATENT DOCUMENTS

| | | | |
|---|---|---|---|
| 2006/0200226 A1* | 9/2006 | Furst | A61P 43/00 623/1.15 |
| 2007/0128905 A1* | 6/2007 | Speakman | B82Y 30/00 439/161 |
| 2007/0241482 A1 | 10/2007 | Giller et al. | |
| 2008/0286488 A1* | 11/2008 | Li | B22F 1/025 427/541 |
| 2011/0103994 A1* | 5/2011 | Siak | B22F 3/105 419/23 |
| 2012/0132644 A1 | 5/2012 | Gu et al. | |
| 2016/0007455 A1* | 1/2016 | Kawato | H05K 3/1283 428/457 |
| 2017/0043395 A1* | 2/2017 | She | B23K 15/0086 |
| 2017/0173696 A1* | 6/2017 | Sheinman | B33Y 10/00 |
| 2018/0051376 A1* | 2/2018 | Sharon | C04B 35/62839 |

FOREIGN PATENT DOCUMENTS

| | | | | |
|---|---|---|---|---|
| TW | 201617297 A | 5/2016 | | |
| WO | WO-2014185102 A1 * | 11/2014 | ............... | H05K 3/10 |
| WO | 2015081996 A1 | 6/2015 | | |
| WO | WO-2015106113 A1 * | 7/2015 | ......... | B23K 15/0093 |
| WO | WO-2015170330 A1 * | 11/2015 | ............... | B22F 3/16 |
| WO | 2016046216 A1 | 3/2016 | | |

\* cited by examiner

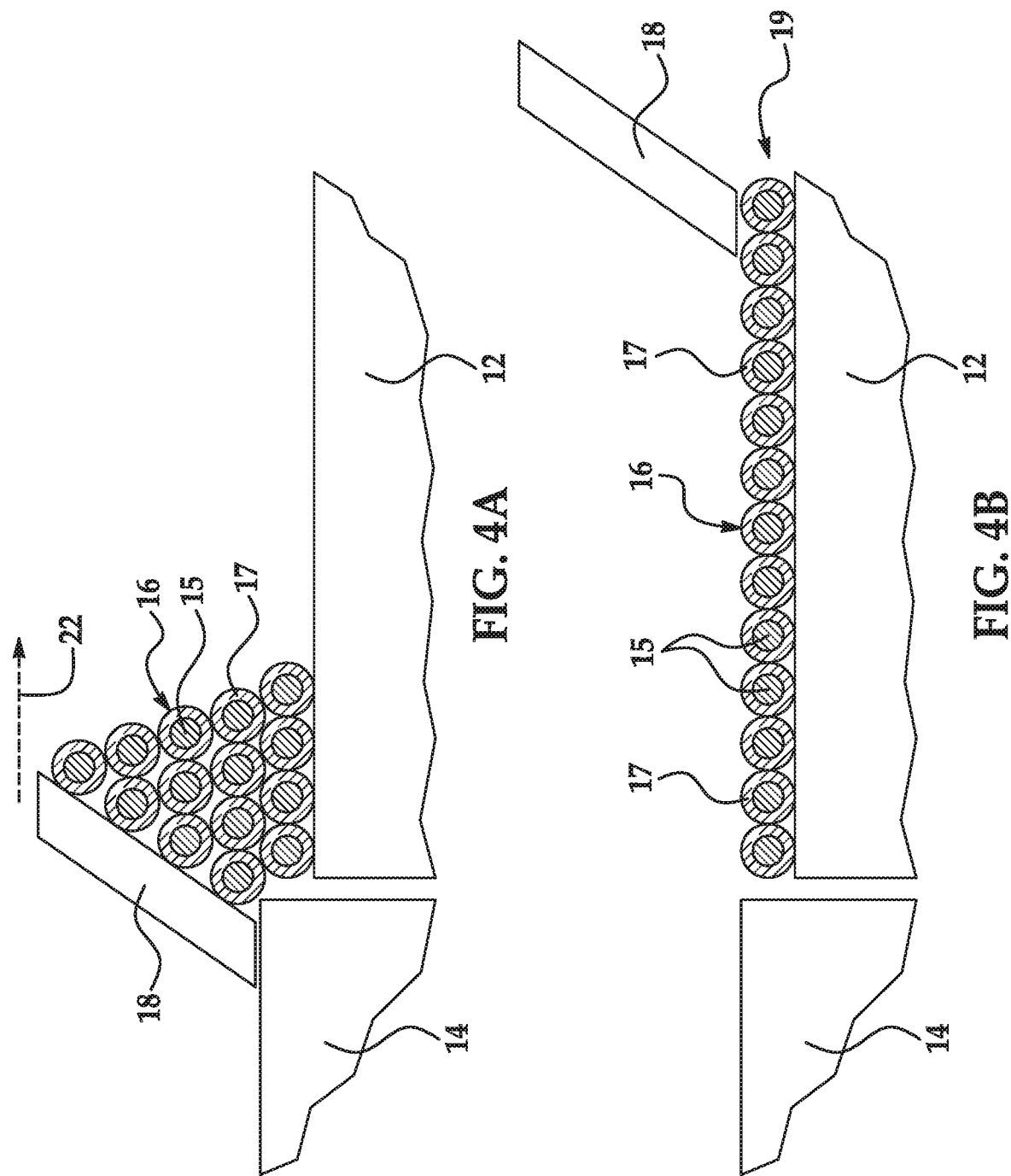

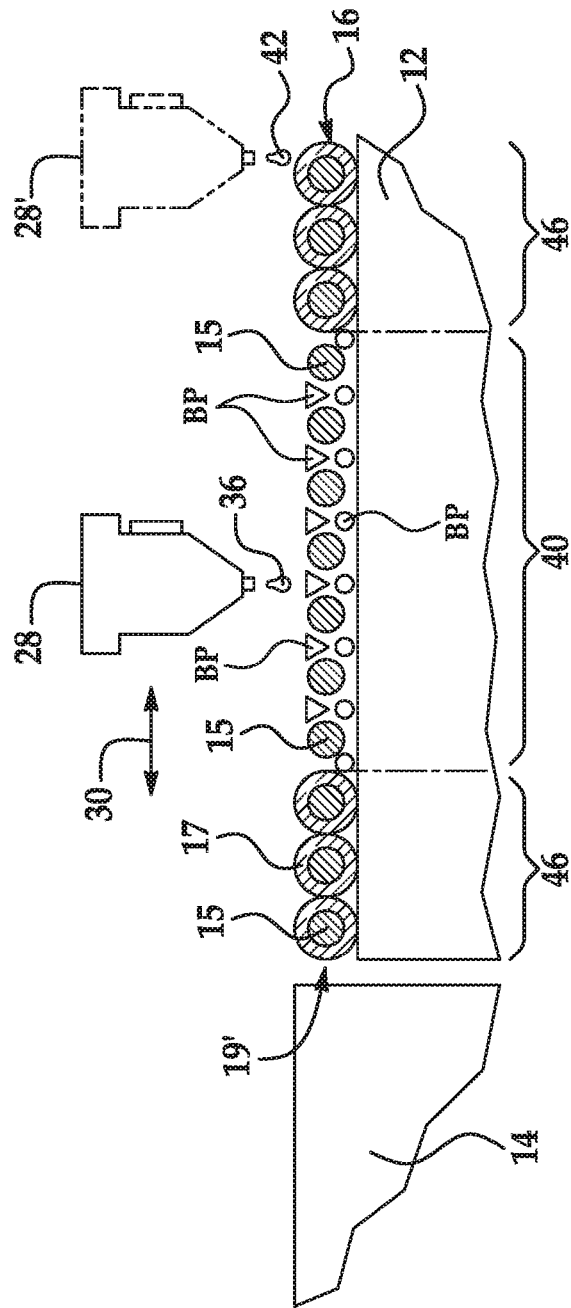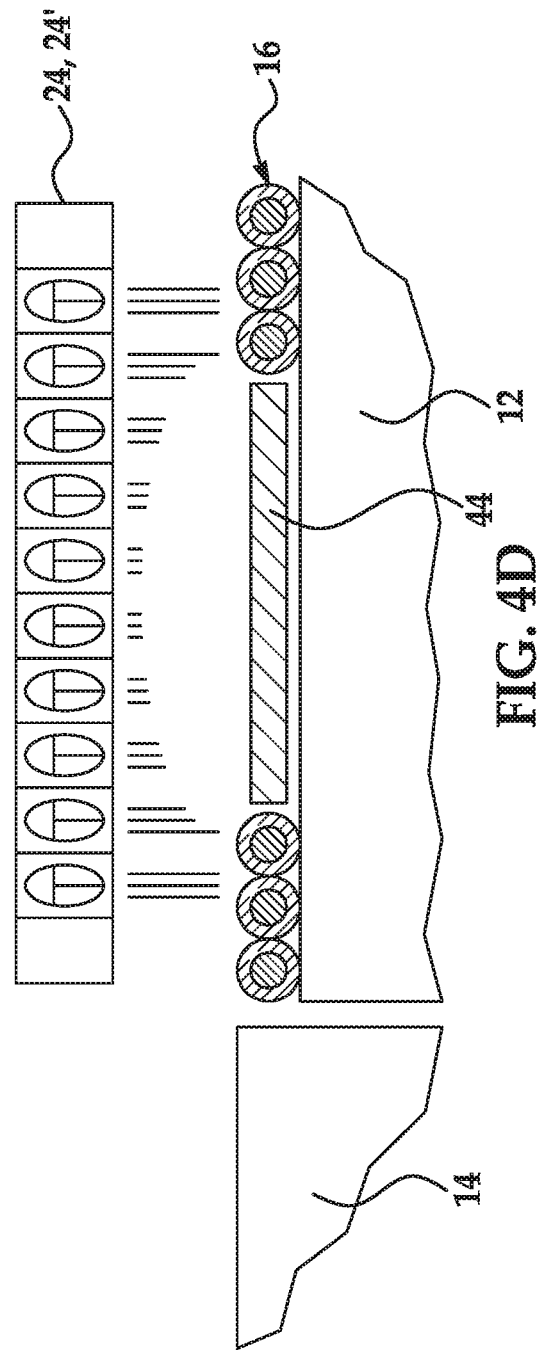

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4D are schematic views depicting the formation of a part layer using an example of the 3D printing method disclosed herein.

DETAILED DESCRIPTION

Examples of a three-dimensional (3D) printing method and system disclosed herein utilize a combination of core-shell build material particles and a reactive chemical. The core of the build material particle is a metal or a metal alloy and the shell of the build material particle is a metal oxide, which has a higher melting point than the core metal or metal alloy. The reactive chemical may be used to pattern respective layers of the core-shell build material particles, because those build material particles exposed to the reactive chemical will undergo a reaction to remove the shell and expose the core, while those build material particles not exposed to the reactive chemical will remain intact as core-shell particles. The selective application of the reactive chemical effectively lowers the melting point of some of the build material by removing the higher melting point shell and exposing the lower melting point core. When the entire layer is exposed to rapid thermal processing, the exposed cores will sinter and the intact build material particles will remain unsintered.

The use of rapid thermal processing (RPT) in the printing method and system disclosed herein heats the layer up to 1000° C. in a timescale of a minute or less. The throughput is dramatically increased compared, for example, to other 3D printing techniques that deliver thermal energy, such as selective laser sintering (SLS), selective electron beam sintering (SES) or electron beam additive manufacturing, soldering, etc. because heating via RPT is orders of magnitude faster than these techniques. Moreover, unlike 3D printing techniques using infrared radiation lamps, RTP is capable of providing energy and power that is suitable for sintering metallic powder and ceramic powders.

The use of the metal oxide shell and the rapid thermal processing in the method(s) disclosed herein reduces the risk of rupturing the metal cores of the build material particles.

Figure 1:
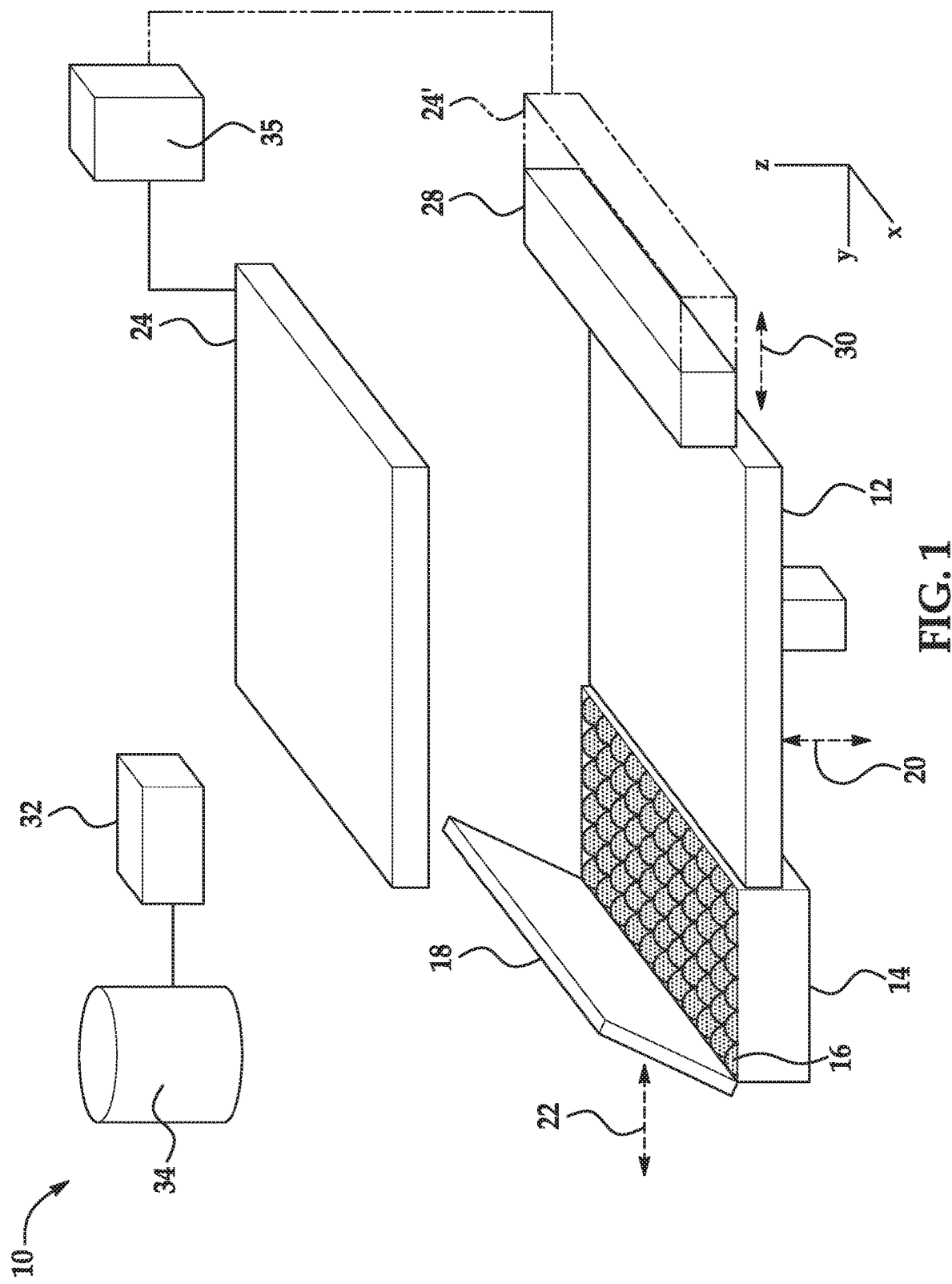
FIG. 1 is a simplified isometric view of an example 3D printing system.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing build material particles 16, and a build material distributor 18.

The build area platform 12 receives the build material particles 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that build material particles 16 may be delivered to the platform 12 or to a previously formed part layer 44 (see FIG. 4D). In an example, when the build material particles 16 are to be delivered, the build area platform 12 may be programmed to advance (e.g., downward) enough so that the build material distributor 18 can push the build material particles 16 onto the platform 12 to form a substantially uniform layer 19 of the build material particles 16 thereon (see, e.g., FIGS. 4A and 4B). The build area platform 12 may also be returned to its original position, for example, when a new part is to be built.

The build material supply 14 may be a container, bed, or other surface that is to position the build material particles 16 between the build material distributor 18 and the build area platform 12. In some examples, the build material supply 14 may include a surface upon which the build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material particles 16 from a storage location to a position to be spread onto the build area platform 12 or onto a previously formed part layer 44.

The build material distributor 18 may be moved in a direction as denoted by the arrow 22, e.g., along the y-axis, over the build material supply 14 and across the build area platform 12 to spread a layer of the build material particles 16 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material particles 16 over the build area platform 12. For instance, the build material distributor 18 may be a counter-rotating roller.

As shown in FIG. 1, the printing system 10 also includes an inkjet applicator 28, which may contain the reactive chemical 36 (see FIG. 4C). The inkjet applicator 28 may be scanned across the build area platform 12 in the direction indicated by the arrow 30, e.g., along the y-axis. The inkjet applicator 28 may be, for instance, a thermal inkjet printhead, a piezoelectric printhead, etc., and may extend a width of the build area platform 12. While a single inkjet applicator 28 is shown in FIG. 1, it is to be understood that multiple inkjet applicators 28 may be used that span the width of the build area platform 12. Additionally, the inkjet applicators 28 may be positioned in multiple printbars. The inkjet applicator 28 may also be scanned along the x-axis, for instance, in configurations in which the inkjet applicator 28 does not span the width of the build area platform 12 to enable the inkjet applicator 28 to deposit the reactive chemical 36 over a large area of a layer of build material particles 16. The inkjet applicator 28 may thus be attached to a moving XY stage or a translational carriage (neither of which is shown) that moves the inkjet applicator 28 adjacent to the build area platform 12 in order to deposit the reactive chemical 36 in predetermined areas of a layer 19 of the build material particles 16 that has been formed on the build area platform 12 in accordance with the method(s) disclosed herein. The inkjet applicator 28 may include a plurality of nozzles (not shown) through which the reactive chemical 36 is to be ejected.

While not shown in FIG. 1, the printing system 10 may also include another inkjet applicator 28', which may contain a detailing agent 42 (shown in FIG. 4C and described further hereinbelow). The inkjet applicator 28' is similar to inkjet applicator 28 and may be configured in any manner previously described in reference to inkjet applicator 28.

The inkjet applicator(s) 28, 28' may deliver drops of the reactive chemical 36 or the detailing agent 42 at a resolution ranging from about 300 dots per inch (DPI) to about 1200 DPI. In other examples, the applicator(s) 28, 28' may deliver drops of the reactive chemical 36 or the detailing agent 42 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, inkjet applicators 28, 28' are able to deliver variable size drops of the reactive chemical 36 and the detailing agent 42, respectively.

Each of the previously described physical elements may be operatively connected to a controller 32 of the printing system 10. The controller 32 may control the operations of the build area platform 12, the build material supply 14, the build material distributor 18, and the inkjet applicator(s) 28, 28'. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part. As such, the controller 32 is depicted as being in communication with a data store 34. The data store 34 may include data pertaining to a 3D part to be printed by the 3D printing system 10. The data for the selective delivery of the build material particles 16, the reactive chemical 36, etc. may be derived from a model of the 3D part to be formed. For instance, the data may include the locations on each layer 19 of build material particles 16 that the inkjet applicator 28 is to deposit the reactive chemical 36. In one example, the controller 32 may use the data to control the inkjet applicator 28 to selectively apply the reactive chemical 36. The data store 34 may also include machine readable instructions (stored on a non-transitory computer readable medium) that are to cause the controller 32 to control the amount of build material particles 16 that is supplied by the build material supply 14, the movement of the build area platform 12, the movement of the build material distributor 18, the movement of the inkjet applicator 28, etc.

As shown in FIG. 1, the printing system 10 may also include a rapid thermal processing unit 24, 24'. In some examples, the rapid thermal processing unit 24 may be in a fixed position with respect to the build material platform 12. In other examples, the rapid thermal processing unit 24' may be positioned to heat each layer 19 after the reactive chemical 36 has been applied thereto. In the example shown in FIG. 1, the rapid thermal processing unit 24' is attached to the side of the inkjet applicator 28, which allows for patterning and heating in a single pass.

The rapid thermal processing unit 24, 24' includes high intensity lamps and/or lasers that are capable of heating patterned build material particles to a temperature up to 1000° C. on a timescale of less than 1 minute. In some instances, heating takes place in several seconds or less. Examples of the high intensity lamps and/or lasers including tungsten-halogen lamps, arc noble gas discharge lamps, quartz halogen lamps, xenon strobe lights, or infrared or other spectral banded lasers.

The rapid thermal processing unit 24, 24' may be operatively connected to a lamp/laser driver, an input/output temperature controller, and temperature sensors, which are collectively shown as RTP system components 35. The RTP system components 35 may operate together to control the rapid thermal processing unit 24, 24'. The temperature recipe (e.g., heating rate) may be submitted to the input/output temperature controller. During heating, the temperature sensors may sense the temperature of the build material particles 16, and the temperature measurements may be transmitted to the input/output temperature controller. For example, a thermometer associated with the heated area can provide temperature feedback. The input/output temperature controller may adjust the lamp power set points based on any difference between the recipe and the real-time measurements. These lamp power set points are sent to the lamp drivers, which transmits appropriate lamp voltages to the lamps/lasers. This is one example of the RTP system components 35, and it is to be understood that other RTP systems may be used.

Figure 2:
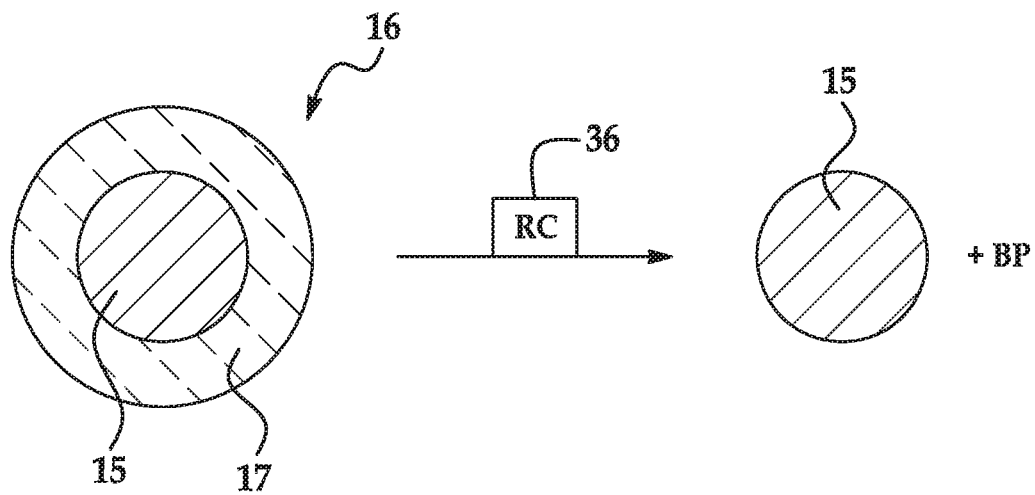
FIG. 2 is a schematic view of the build material particle before and after exposure to a reactive chemical.

Referring now to FIG. 2, an example of the build material particle 16 is depicted both before exposure to the reactive chemical 36 (left side of arrow) and after exposure to the reactive chemical 36 (right side of arrow). As mentioned above, the build material particle 16 includes the core 15 and the shell 17 surrounding the core 15. The core 15 has a diameter ranging from about 20 μm to about 100 μm, and the shell 17 has a thickness ranging from about 1 nm to about 1 μm. In an example, the thickness of the shell 17 may range from about 3 nm to about 0.5 μm.

The core 15 is a metal or metal alloy. Examples of the metal include aluminum (Al), titanium (Ti), iron (Fe), copper (Cu), etc. The metal alloy includes any of the previously listed metals as a primary metal and one or more other metals alloyed with the primary metal. With the metal alloy, the relative percentage of the individual metals may be selected so that the core 15 has a melting point that is at least 5% lower than the melting point of the shell 17 that is to be formed thereon. The other metal(s) in the alloy may be any metal that has a melting point at or below the melting point of the primary metal, or a melting point between the melting point of the primary metal and the metal oxide that forms the shell 17. If the core 15 is an alloy formed of lamina or layers, the primary metal can control the melting of the other metal(s) in the alloy.

The shell 17 is a metal oxide having a melting temperature that is higher than the melting temperature of the metal core or the primary metal in the metal alloy core. As examples, the shell 17 may be aluminum oxide ($Al_2O_3$), titanium dioxide ($TiO_2$), iron oxide ($Fe_3O_4$), copper (II) oxide (CuO), etc.

The metal oxide shell 17 may include the native oxide that is present on the metal core 15. This native oxide may form when the core 15 is present in an oxygen environment, and generally ranges in thickness from about 1 angstrom to about 50 angstroms. To increase the thickness of the metal oxide shell 17, additional metal oxide may be grown in an oxygen environment, or may be deposited by sputtering, sol-gel, chemical vapor deposition (CVD), pulsed laser evaporation, or any other extrusion or jetting approach.

Any metal or metal alloy core 15 may be paired with any metal oxide shell 17 having a higher melting point, where the difference in melting points is at least 5%. In some instances, the difference in the core 15 melting point and the shell 17 melting point is at least 10%, although the percent difference may be higher. Some specific examples of core 15/shell 17 combinations include aluminum/aluminum oxide, titanium/titanium dioxide, iron/iron oxide, copper/copper (II) oxide.

FIG. 2 also depicts the exposure of the build material particle 16 to the reactive chemical 36. The reactive chemical 36 that is used is capable of reacting with the metal oxide shell 17, while leaving the metal or metal alloy core 15 intact (i.e., does not react with the core 15). The reaction between the reactive chemical 36 and the metal oxide shell 17 is a redox reaction resulting in the reduction of the metal oxide to at least a metal-containing byproduct BP.

Examples of reactive chemicals 36 that are capable of reacting with the metal oxide shell 17 include hydrochloric acid (HCl), hydrofluoric acid (HF), nitric acid ($HNO_3$), or sulfuric acid ($H_2SO_4$).

In one example, the metal core 15 is aluminum (having a melting point of about 660° C.), the metal oxide shell 17 is aluminum oxide (having a melting point of about 2070° C.), and the reactive chemical 36 is hydrochloric acid. Upon exposing the build material particle 16 including the aluminum oxide shell 17 to hydrochloric acid, the following reaction takes place:

$$Al_2O_3 + 6HCl \rightarrow 2AlCl_3 + 3H_2O.$$

The aluminum oxide shell is reduced to aluminum (in the form of aluminum chloride), and is removed from the surface of the aluminum metal core 15 so that the aluminum metal core 15 is exposed. The aluminum metal core 15 has a lower melting point than the aluminum oxide shell 17, so the exposed cores 15 (i.e., any of the build material particles 16 exposed to the reactive chemical 36) will melt at a lower temperature than those build material particles 16 that remain intact (i.e., that still have the metal oxide shell 17 thereon).

In another example, the metal core 15 is copper (having a melting point of about 1,085° C.), the metal oxide shell 17 is copper (II) oxide (having a melting point of about 1,326° C.), and the reactive chemical 36 is hydrochloric acid. Upon exposing the build material particle 16 including the aluminum oxide shell 17 to hydrochloric acid, nitric acid, or sulfuric acid, the following respective reactions take place:

$$CuO + 2HCl \rightarrow CuCl_2 + H_2O;$$

$$CuO + 2HNO_3 \rightarrow Cu(NO_3)_2 + H_2O;$$

$$CuO + H_2SO_4 \rightarrow CuSO_4 + H_2O.$$

The copper oxide shells are reduced to various copper(II) salts, and is removed from the surface of the copper metal core 15 so that the copper metal core 15 is exposed. The copper metal core 15 has a lower melting point than the copper (II) oxide shell 17, so the exposed cores 15 (i.e., any of the build material particles 16 exposed to the reactive chemical 36) will melt at a lower temperature than those build material particles 16 that remain intact (i.e., that still have the metal oxide shell 17 thereon).

An example of the 3D printing method utilizing the build material particles 16 and the reactive chemical 36 is shown in FIGS. 3 and 4A-4D. These figures will now be discussed together.

Prior to execution of the method 100 or as part of the method 100, the controller 32 may access data stored in the data store 34 pertaining to a 3D part that is to be printed. The controller 32 may determine the number of layers of build material particles 16 that are to be formed, and the locations at which the reactive chemical 36 from the inkjet applicator 28 is to be deposited on each of the respective layers. In some instances, the controller 32 may determine the locations at which the detailing agent 42 from the inkjet applicator 28' is to be deposited on each of the respective layers.

Figure 3:
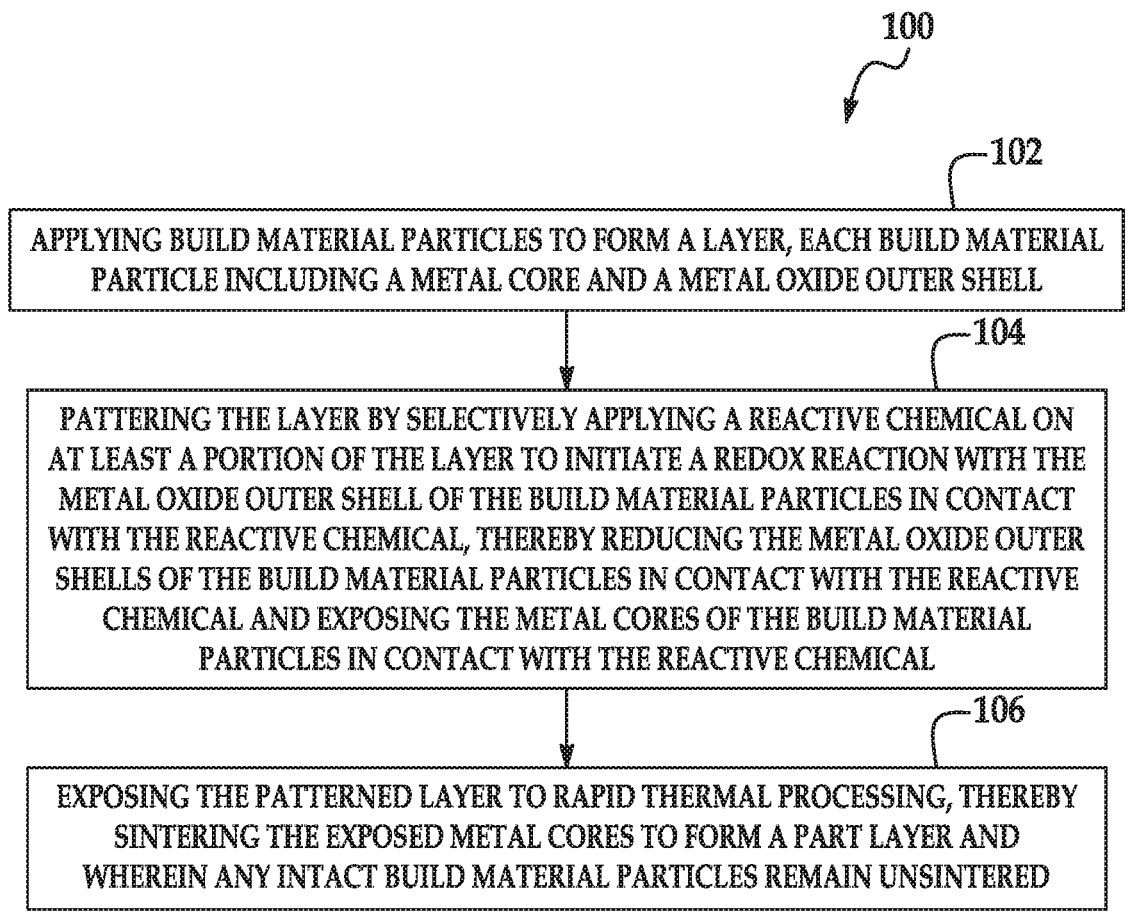
FIG. 3 is a flow diagram illustrating an example of a 3D printing method.

As shown at reference numeral 102 in FIG. 3 and in FIGS. 4A and 4B, the method 100 includes applying the build material particles 16 to form a layer 19. In FIG. 4A, the build material supply 14 may supply the build material particles 16 into a position so that they are ready to be spread onto the build area platform 12. In FIG. 4B, the build material distributor 18 may spread the supplied build material particles 16 onto the build area platform 12. The controller 32 may execute control build material supply instructions to control the build material supply 14 to appropriately position the build material particles 16, and may execute control spreader instructions to control the build material distributor 18 to spread the supplied build particles 16 over the build area platform 12 to form a layer 19 of build material particles 16 thereon. As shown in FIG. 4B, one layer 19 of the build material particles 16 has been applied.

The layer 19 has a substantially uniform thickness across the build area platform 12. In an example, the thickness of the layer 19 ranges from about 50 μm to about 300 μm, although thinner or thicker layers may also be used. For example, the thickness of the layer 19 may range from about 20 μm to about 500 μm, or from about 30 μm to about 300 μm. The layer 19 thickness may be about 2× the particle 16 diameter at a minimum for finer part definition.

Each build material particle 16 includes the core 15 surrounded by the shell 17. The build material particles 16 may be similarly sized particles or differently sized particles. In the example shown in FIG. 4A, the build material particles 16 are similarly sized particles.

In one example of the method 100, after the build material particles 16 are applied to form the layer 19, the layer 19 is patterned by selectively applying the reactive chemical 36 on at least a portion 40 of the build material particles 16, as shown at reference numeral 104 in FIG. 3 and in FIG. 4C. As illustrated in FIG. 4C, the reactive chemical 36 may be dispensed from the inkjet applicator 28.

The controller 32 may execute instructions to control the inkjet applicator 28 (e.g., in the directions indicated by the arrow 30) to deposit the reactive chemical 36 onto predetermined portion(s) 40 of the particles 16 that are to ultimately be sintered to form the 3D part layer 44 (see FIG. 4D). The inkjet applicator 28 may be programmed to receive commands from the controller 32 and to deposit the reactive chemical 36 according to a pattern of a cross-section for the 3D part layer 44 that is to be formed. As used herein, the cross-section of the 3D part layer 44 refers to the cross-section that is parallel to the surface of the build area platform 12. In the example shown in FIG. 4C, the inkjet applicator 28 selectively applies the reactive chemical 36 on those portion(s) 40 of the layer 19 that are to be fused/melted/sintered to become the first layer 44 of the 3D part. As an example, if the 3D part that is to be formed is to be shaped like a cube or cylinder, the reactive chemical 36 will be deposited in a square pattern or a circular pattern (from a top view), respectively, on at least a portion 40 of the layer 19 of the build material particles 16. In the example shown in FIG. 4C, the reactive chemical 36 is deposited in a square pattern on the portion 40 of the layer 19 and not on the portions 46.

When the reactive chemical 36 is deposited on the build material particles 16 in the portion(s) 40 of the layer 19, the reactive chemical 36 initiates a redox reaction with the metal oxide shell(s) 17 in contact therewith. More specifically, the reactive chemical 36 reduces the metal oxide shell(s) 17, which forms at least the metal-containing byproduct BP and exposes the underlying cores 15. The byproduct(s) BP are intermingled among the now exposed cores 15 (as shown in FIG. 4C).

As shown in FIG. 4C, the build material particles 16 in the portion(s) 46 are not exposed to the reactive chemical 36 and thus remain intact (i.e., with the shell 17 surrounding the core 15).

The byproduct(s) BP of the redox reaction may be removed prior to rapid thermal processing, may be removed during rapid thermal processing, or may be integrated into the 3D part layer 44 during rapid thermal processing. Whether byproduct removal is performed, and at which stage byproduct removal is performed (when it is performed), may be determined by the type of byproduct(s) that is/are formed.

When the redox reaction byproduct(s) BP is/are water soluble, water may be added (e.g., jetted) to the build material platform 12 to dissolve the byproduct(s) BP. The dissolved byproduct(s) BP can then be removed via draining from the system 10, or via evaporation, or via binding to a vapor. Evaporation may be accomplished during the rapid thermal processing (since the temperature during RTP is above the boiling point of the water). Evaporation of the dissolved byproduct(s) BP may also be accomplished during a separate heating step that is performed before rapid thermal processing.

When the redox reaction byproduct(s) BP is/are hygroscopic, water may be added (e.g., jetted) to the build material platform 12 to displace the byproduct(s) BP with the water molecules to form a hydrate. The hydrate can then be removed via draining from the system 10 or evaporation. Depending on the process, other techniques that may be used to remove the hydrate include centrifugation, competitive surface binding, a peeling process, etc.

When the redox reaction byproduct(s) BP will not deleteriously affect, or will enhance the quality (e.g., mechanical characteristics, aesthetics, etc.) of the 3D part layer 44, the redox reaction byproduct(s) BP may not be removed, and may be integrated into the 3D part layer 44 during the rapid thermal processing. It may be desirable to leave a byproduct BP in that provides a finishing effect and/or prevents or reduces a potentially deleterious effect (e.g., oxidation). As an example, if a byproduct BP is capable of forming a passivation layer, it may be left in the 3D part layer 44 to prevent or reduce corrosion, or to render the 3D part layer 44 salubrious for a surrounding environment (e.g., as an anti-oxidant or bactericide for tissue in a biomedical application).

As shown in FIG. 4C, the detailing agent 42 may be selectively applied on the portion(s) 46 of the build material particles 16 that is/are not exposed to the reactive chemical 36. The detailing agent 42 may be dispensed from the inkjet applicator 28'. It is to be understood that in some examples of the method 100, the detailing agent 42 is not applied.

The detailing agent 42 may provide an evaporative cooling effect that reduces the temperature of the build material particles 16 in contact with the detailing agent 42 during rapid thermal processing.

The detailing agent 42 may be water alone. The detailing agent 42 may also include a surfactant, a co-solvent, and a balance of water. In some examples, the detailing agent 42 consists of these components, and no other components. In some instances, the detailing agent 42 further includes an anti-kogation agent, a biocide, or combinations thereof.

The surfactant(s) may be used so that the detailing agent 42 quickly wets the build material particles 16. As an example, the detailing agent 42 may include non-ionic, cationic, and/or anionic surfactants, which may be present in an amount ranging from about 0.01 wt % to about 5 wt % based on the total wt % of the detailing agent 42. In at least some examples, the detailing agent 42 may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The water-based detailing agent 42 may also include an organic co-solvent. The co-solvent(s) may be used to improve reliability, nozzle health, and decap performance (i.e., the ability of the fluid to readily eject from a printhead, upon prolonged exposure to air). The co-solvent(s) may be present, in total in the detailing agent 42, in an amount ranging from about 1 wt % to about 50 wt % (based on the total wt % of the detailing agent 42), depending, at least in part, on the jetting architecture used to dispense the detailing agent 42. In an example, the co-solvent is present in the detailing agent 42 in an amount of about 10 wt % based on the total wt % of the detailing agent 42. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

As mentioned above, some examples of the detailing agent 42 may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the detailing agent 42 may include a total amount of antimicrobial agents that ranges from about 0.1 wt % to about 0.25 wt %.

When the detailing agent 42 is to be applied via thermal inkjet applications, an anti-kogation agent may also be included. Kogation refers to the deposit of dried agent on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the detailing agent 42 in an amount ranging from about 0.1 wt % to about 1 wt % of the total wt % of the detailing agent 42.

The portions 46 of the build material particles 16 to which the detailing agent 42 is applied do not set/cure/fuse during the rapid thermal processing (shown at reference numeral 106 in FIG. 3 and in FIG. 4D). The detailing agent 42 may prevent the build material particles 16 in contact with the detailing agent 42 from reaching the temperature necessary for the build material particles 16 to sinter/melt/fuse. This may be due, in part, to the co-solvent and water of the detailing agent 42 providing evaporative cooling to the build material particles 16 in proximity thereof (e.g., in thermal contact therewith). It is believed that, at least in some examples, evaporation of 1.3 milligrams per $cm^2$ of the detailing agent 42 can remove up to 3 Joules of energy per $cm^2$ of the build material particles 16. This energy loss is enough to keep the build material particles 16 from heating and melting at those portion(s)/area(s) (e.g., reference numeral 46) where the detailing agent 42 is applied. In an example, the temperature of the build material particles 16 that are in contact with the detailing agent 42 during rapid thermal processing may be at least 20° C. less than the temperature of the exposed metal cores 15 during rapid thermal processing.

In one example, the other portions 46 to which the detailing agent 42 is applied may be all of portions 46 which do not have the reactive chemical 36 applied thereto. For example, the detailing agent 42 may be applied on all of the build material particles 16 outside of an edge boundary (i.e., the outermost portions where the reactive chemical 36 is selectively deposited onto the build material particles 16 during 3D printing) of the 3D part layer 44 during its formation. In another example, the other portion(s) 46 to which the detailing agent 42 is applied may be less than all of portions 46 which do not have the reactive chemical 36 applied thereto. In this example, the detailing agent 42 may be applied on the outside edge of the boundary of the portion(s) 40 and not on the rest of the portion(s) 46.

After the reactive chemical 36 is selectively applied in the desired portion(s) 40, with or without the detailing agent 42 on other portion(s) (e.g., portions 46), the entire layer 19' (which includes some intact build material particles 16 as well as exposed cores 15, and may include byproduct(s) BP) is exposed to rapid thermal processing. This is shown at reference numeral 106 of FIG. 3 and in FIG. 4D.

Rapid thermal processing may be performed using the RTP unit 24, 24', which heats the entire layer 19' up to a temperature that equal to or greater than the melting point of the exposed cores 15 (e.g., up to 1000° C.) and is less than the melting point of the metal oxide shell 17 of the intact build material particles 16. As such, the temperature used during rapid thermal processing depends upon the material of the cores 15 and the material of the shells 17. Since the intact build material particles 16 still have the metal oxide shell 17 thereon, and the metal oxide shell 17 has a much higher melting point than the exposed cores 15, rapid thermal processing will melt the exposed cores 15 and will not melt the intact build material particles 16. The melted cores 15 will sinter or fuse together to form the 3D part layer 44, while the intact build material particles 16 remain unsintered and thus unattached (i.e., they do not bind together).

The processes shown in FIGS. 4A through 4D may be repeated to iteratively build up several 3D printed layers on the 3D part layer 44, and to form a final part.

When the final 3D part is formed, the method may further include annealing the final part. Annealing may be performed to increase the strength of the final part. Annealing temperatures may range from about 250° C. to about 800° C. Annealing may shrink the part, however, such shrinkage may be compensated for when modeling the 3D part to be formed.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 20 μm to about 100 μm should be interpreted to include the explicitly recited limits of 20 µm to 100 µm, as well as individual values, such as 55 µm, 75 µm, 95.5 µm, 29 µm, etc., and sub-ranges, such as from about 25 µm to about 85 µm, from about 60 µm to about 90 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
    first, applying build material particles to form a layer, each build material particle including a metal core and a metal oxide outer shell;
    then, patterning the layer by selectively applying a reactive chemical on at least a portion of the layer to initiate a redox reaction with the metal oxide outer shells of the build material particles in contact with the reactive chemical, thereby reducing the metal oxide outer shells of the build material particles in contact with the reactive chemical and exposing the metal cores of the build material particles in contact with the reactive chemical; and then
    exposing the patterned layer to rapid thermal processing, thereby sintering the exposed metal cores to form a part layer and wherein any intact build material particles with the metal oxide outer shell remaining thereon remain unsintered.

2. The 3D printing method as defined in claim 1 wherein:
    the metal core is aluminum and the metal oxide outer shell is aluminum oxide;
    or
    the metal core is titanium and the metal oxide outer shell is titanium dioxide; or
    the metal core is iron and the metal oxide outer shell is iron oxide ($Fe_3O_4$); or
    the metal core is copper and the metal oxide outer shell is copper (II) oxide (CuO).

3. The 3D printing method as defined in claim 1 wherein the metal core has a diameter ranging from about 20 µm to about 100 µm, and wherein the metal oxide shell has a thickness ranging from about 1 nm to about 0.5 µm.

4. The 3D printing method as defined in claim 1 wherein the reactive chemical is an acid selected from the group consisting of hydrochloric acid, hydrofluoric acid, nitric acid and sulfuric acid.

5. The 3D printing method as defined in claim 1, further comprising removing a byproduct of the redox reaction before exposing the layer to rapid thermal processing.

6. The 3D printing method as defined in claim 5 wherein the removing is accomplished by:
    jetting water on the layer to dissolve the byproduct; and then draining the water.

7. The 3D printing method as defined in claim 5 wherein the removing is accomplished by:
    jetting water on the layer to dissolve the byproduct; and then evaporating the water.

8. The 3D printing method as defined in claim 7 wherein the evaporating of the water takes place during the rapid thermal processing.

9. The 3D printing method as defined in claim 1, further comprising selectively applying a detailing agent on an other portion of the layer, which includes the intact build material particles, that is not exposed to the reactive chemical.

10. The 3D printing method as defined in claim 1, further comprising building a part by repeating the 3D printing method to form several part layers.

11. The 3D printing method as defined in claim 10, further comprising annealing the part.

12. The 3D printing method as defined in claim 1 wherein rapid thermal processing involves heating the layer to a temperature up to 1000° C. in less than 1 minute.

13. The 3D printing method as defined in claim 1 wherein the metal core is iron and the metal oxide outer shell is iron oxide ($Fe_3O_4$).

* * * * *